Figure 1:
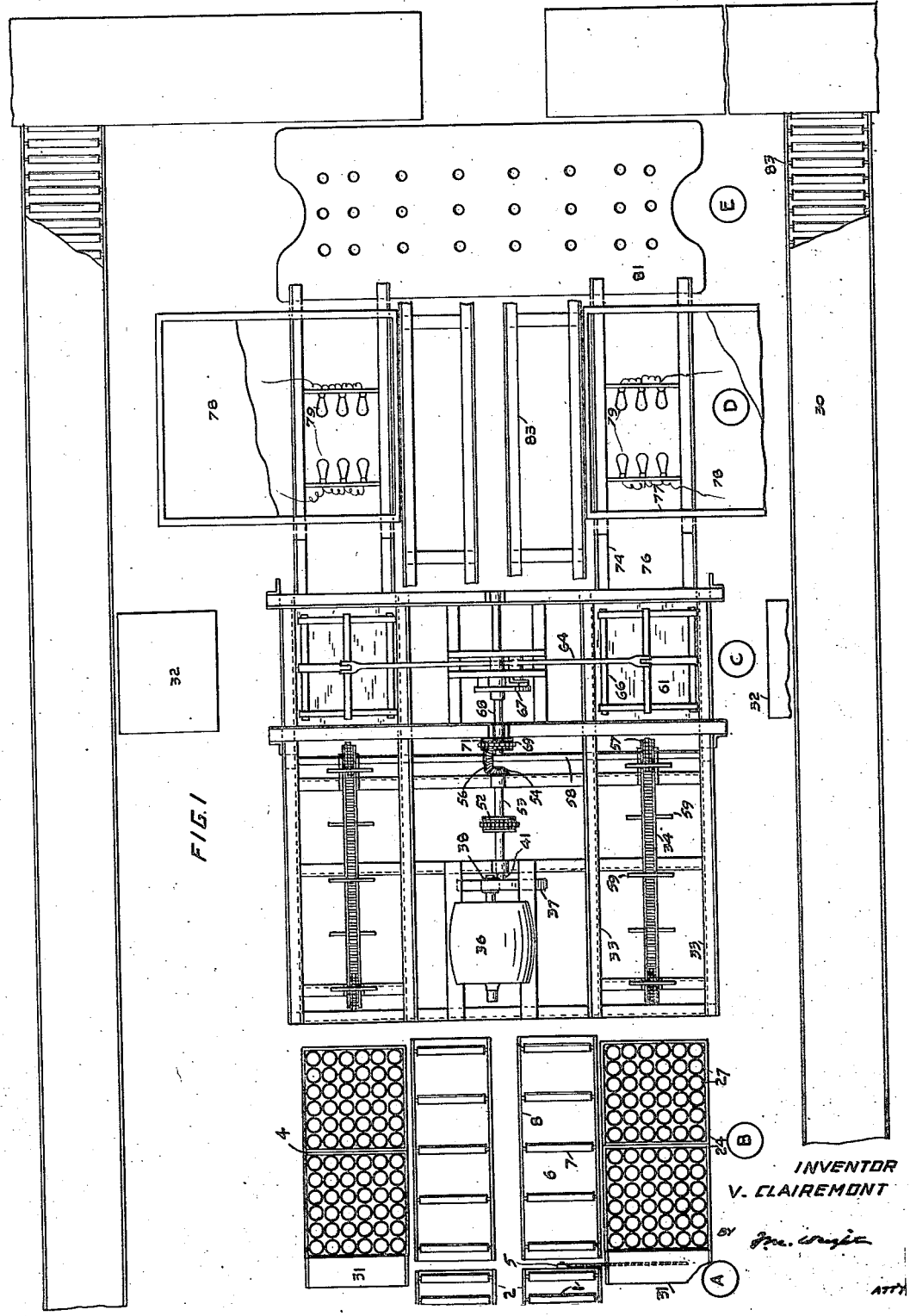

V. CLAIREMONT.
METHOD OF PREPARING EGGS FOR STORAGE.
APPLICATION FILED JULY 26, 1919.

1,419,956.

Patented June 20, 1922.
4 SHEETS—SHEET 1.

INVENTOR
V. CLAIREMONT
BY
ATT'Y

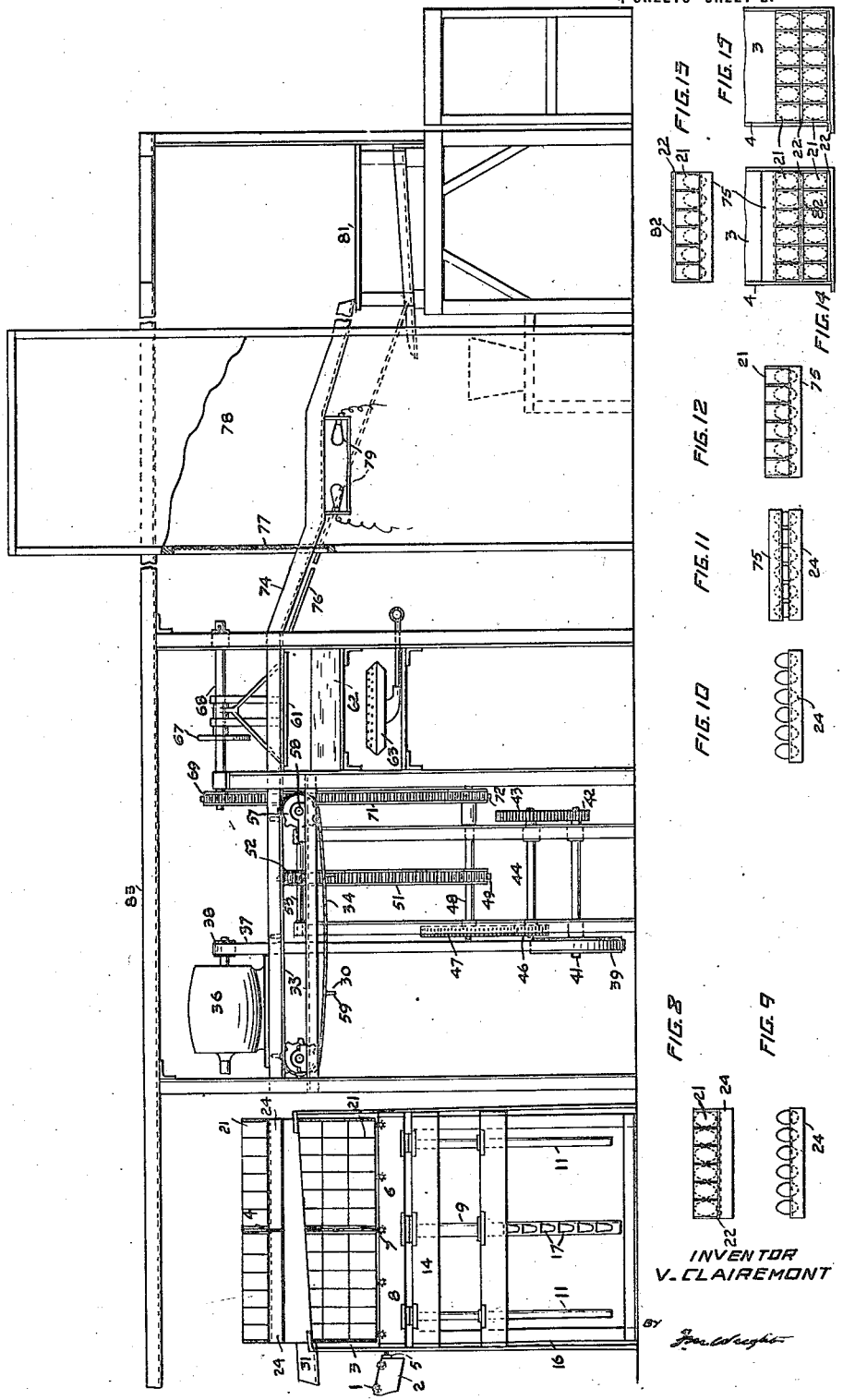

V. CLAIREMONT.
METHOD OF PREPARING EGGS FOR STORAGE.
APPLICATION FILED JULY 26, 1919.

1,419,956.

Patented June 20, 1922.
4 SHEETS—SHEET 3.

INVENTOR
V. CLAIREMONT

BY

ATT'Y.

V. CLAIREMONT.
METHOD OF PREPARING EGGS FOR STORAGE.
APPLICATION FILED JULY 26, 1919.
1,419,956.
Patented June 20, 1922.
4 SHEETS—SHEET 4.
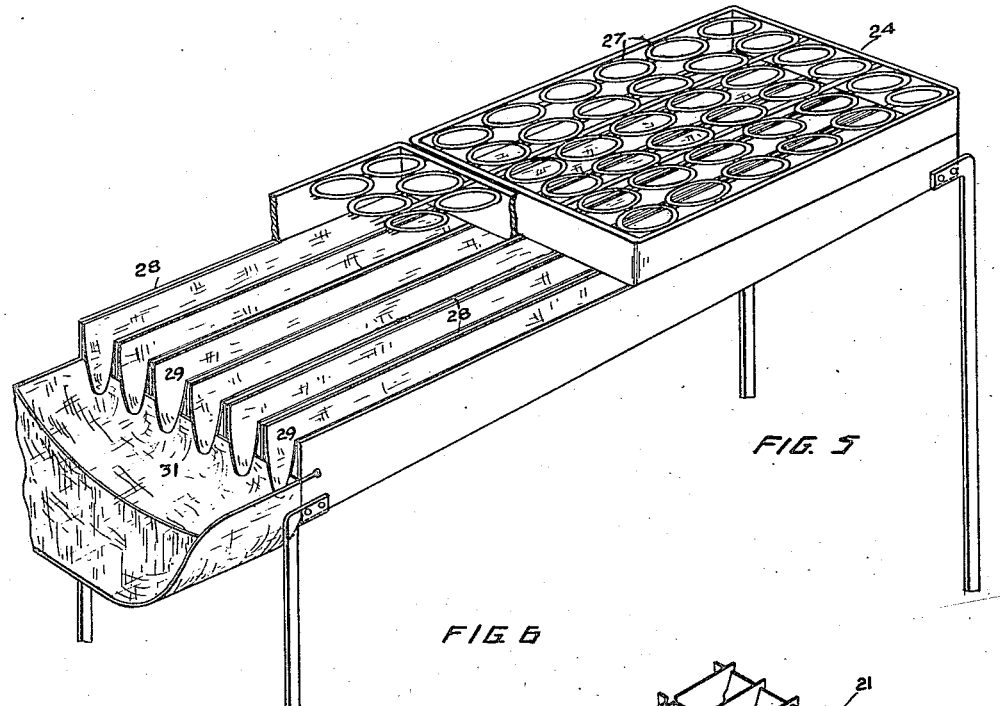
FIG. 5
FIG. 6
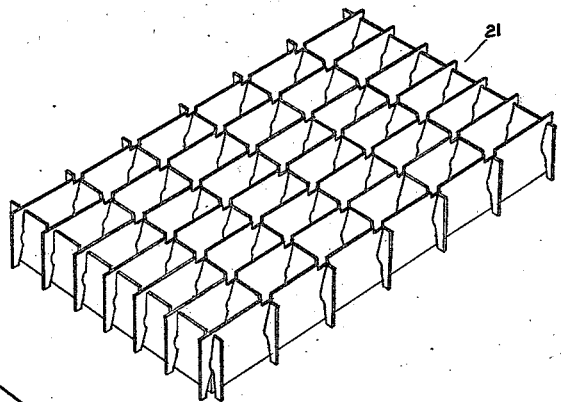
FIG. 7
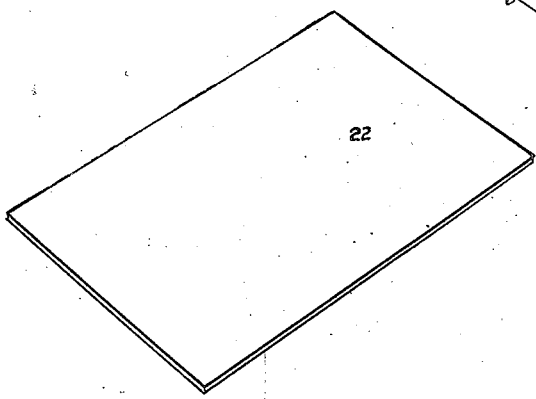
INVENTOR
V. CLAIREMONT
BY
ATT'Y.

UNITED STATES PATENT OFFICE.

VICTOR CLAIREMONT, OF SAN FRANCISCO, CALIFORNIA.

METHOD OF PREPARING EGGS FOR STORAGE.

1,419,956.          Specification of Letters Patent.   Patented June 20, 1922.

Application filed July 26, 1919. Serial No. 313,570.

*To all whom it may concern:*

Be it known that I, VICTOR CLAIREMONT, a citizen of the United States, residing at San Francisco, in the county of San Francisco and State of California, have invented new and useful Improvements in Methods of Preparing Eggs for Storage, of which the following is a specification.

The object of the present invention is to provide an improved process for grading, selecting, processing and candling eggs in preparation for cold storage, by which a large number of eggs can be so treated in a comparatively short time and without the use of expert labor.

The treatment of eggs in preparation for storage is now a well established industry, but, on account of the fact that the production of eggs is much more abundant at a certain season of the year, namely, in the months of March and April, than in the remainder of the year, and also that, under the present systems of treatment for storage, especially the candling of the eggs to remove therefrom the defective eggs, expert labor is required, and that expert candlers are few in number and difficult to obtain on account of the fact that their services are only needed for a month or two in the year, the number of eggs that can be packed for cold storage is by no means commensurate with the number of eggs that could be so packed. The packing under the present system cannot keep pace with the supply.

Furthermore, under the present system, eggs are collected at various points in the country districts and are shipped by rail to a central storage plant, as, for instance, in New York city. Before shipment, they are graded by hand, but the grading cannot be absolutely relied on. Moreover a considerable number of the eggs, on an average from 15 to 18 eggs in a case of 30 dozen eggs, become cracked in transportation. Under the present system these cracked eggs are treated just like the sound eggs and are placed in storage, the reason being that the only way to detect whether or not the eggs are cracked is by the sound or by candling, and it is practically impossible to obtain help to do this in the short time permitted. Consequently, these cracked eggs go into storage with the others. They come out moldy and unfit for use, and, in addition, they infect the sound eggs. Not only is loss caused to some of the sound eggs on this account, but there is the extra expense of storage of unsound eggs, transportation to the places where they are to be retailed, and storage therein before they are finally sold to the ultimate consumer, with the additional inconvenience that the eggs have to be sold with the knowledge that there are a number of eggs in a case unfit for use.

It is the object of the present invention to provide a machine which, by dispensing with the necessity of expert candlers, and by the rapidity of operation of the machine itself, will enable the packing to keep pace with the supply, as well as exclude cracked and unfit eggs from storage.

Figure 4:
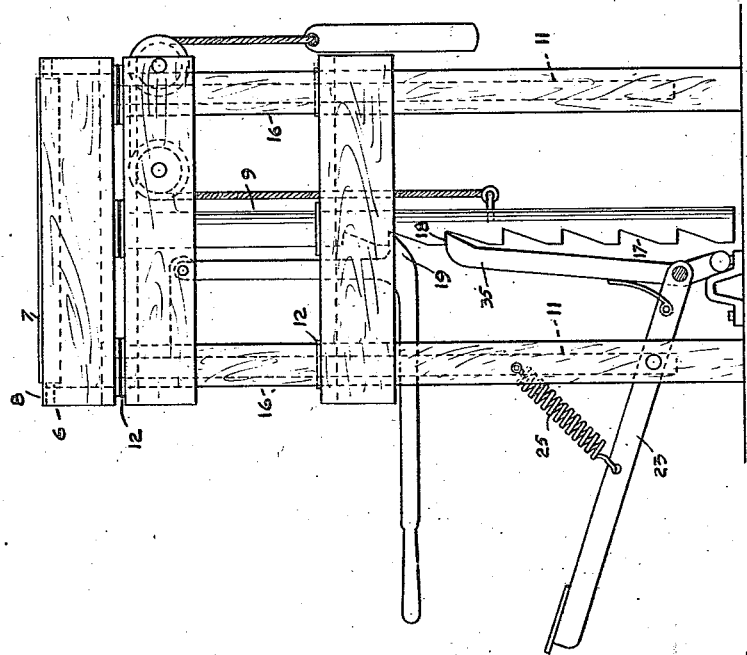
Figure 5:
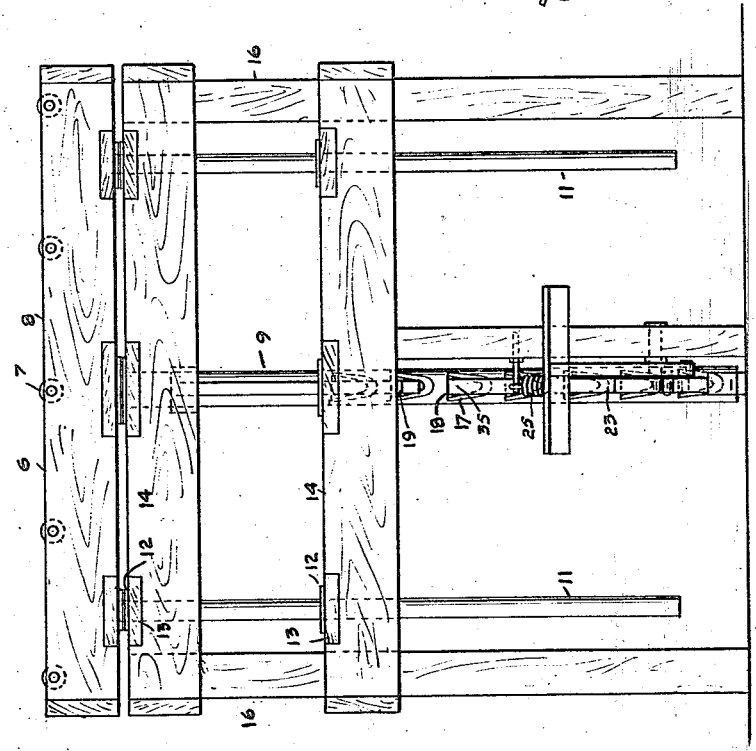

In the accompanying drawing, Figure 1 is a broken plan view of my improved apparatus; Figure 2 is a broken side view thereof; Figure 3 is a side view of a lifting table; Figure 4 is an end view of the lifting table; Figure 5 is a broken perspective view of a grading device; Figure 6 is a perspective view of a filler; Figure 7 is a similar view of a flat; Figures 8 to 15 are diagrammatic views, illustrating, in relation to Figure 2, various stages in the treatment of the eggs in the present invention.

Referring to the drawing, and especially to Figure 1, showing a plan of the apparatus, it will be seen that said apparatus is in two halves exactly alike, except that there are not duplicated an electric motor for driving the operating mechanism and a shaft and gearing for transmitting the power of the motor to said mechanism. While I shall, therefore, describe in detail only one side of the device, it is to be understood that the same description applies to the other side thereof.

1 indicates rollers rotatably mounted in sides 2 of a conveyor, said sides being inclined at a suitable angle, as shown in Figure 2, so that cases of eggs will slide down said conveyor on said rollers 1 by their own weight. These cases, shown at 3, each contain 10 collapsible cardboard fillers 21, there being three dozen eggs in each filler. These fillers are arranged in the case in two vertical series of five in each series, the fillers of the two vertical series being separated by a vertical partition 4. Before being supplied to said conveyors, the near sides and the tops of the cases are removed. The cases are arrested at the front ends of the conveyors by a pivoted stop 5 having a handle by which it may be actuated. At the proper time, said handle is actuated by one of two men at "A" and "B," respectively, to withdraw the stop from the path of the cases.

The foremost case then slides by its own weight, and is in addition pushed forward by the succeeding cases, on to a support 6, shown more particularly in Figures 3, 4, comprising rollers 7 journaled in side bars 8 secured to, and resting on, a central supporting tubular post 9, and also formed with four depending guides 11, said guides extending through bearings 12 in transverse bars 13, the ends of which are secured to horizontal beams 14 supported on stationary vertical posts 16. The supporting post 9 is formed with notches 17 having horizontally extending shoulders 18 each adapted to be engaged by a dog 19. On every level in the case, there are two fillers 21, each containing three dozen eggs, and a flat 22 for each filler, by which is meant a rectangular sheet of cardboard of the same horizontal dimensions as the filler. An operator "B" first takes care that the topmost flats are substantially on the same level, as shown in Figure 2, as the top of a bottomless basket 24, shown in detail in Figure 5. If said flats are not sufficiently high, he raises them by means of a lever 23 operated against a spring 25 and actuating a spring actuated pawl 35, Figure 4. He then draws one of the topmost flats and the filler resting thereon from the case and on to the top of a bottomless basket or frame 24, as shown diagrammatically in Figure 8. Said frame 24 is of exactly the same horizontal dimensions as the filler and has four sides each about one inch high, in the top of which are secured three dozen wire rings 27, corresponding in location and approximately in size to the cells of the filler, of a diameter of $1\frac{9}{16}$ inches, secured to each other and to the sides of the frame. Eggs which are more than $1\frac{9}{16}$ inches wide and which are, therefore, suitable for storage purposes, are not able to pass through the circular wire rings 27 of the frame 24, but eggs which are less than that size do pass through the wire rings. The frame 24 rests upon a series, six being here shown, of parallel walls 28 spaced apart the same distance as the diameter of the wire rings in the frame 24. From the tops of said walls 28 depend individual canvas troughs 29. The flat 22 which is interposed between the filler and the frame is now drawn out. The eggs which are small enough to pass through the rings in the frame drop into said troughs 29. Said troughs are so arranged that their bottoms are all inclined the same way, to the left, as shown in Figure 5, so that the eggs so dropping will roll or slide down said troughs into a receptacle 31 having a flexible bottom, as of canvas. The operator "A" collects these small eggs from the receptacle 31 and places them in a filler to be cased and sold as "seconds." The grading is thus completed.

When the case is empty, the operator "B" transfers it to a conveyor 30 by which it is automatically conveyed to the proximity of a table 81 which is hereinafter described.

The operator "B" now removes the filler from the top of the frame and pushes or lifts the basket or frame and eggs therein, shown diagrammatically in Figure 9, on to a slide 33 formed of angle irons, between which travels a sprocket chain 34, which derives its motion from an electric motor 36 in the following manner. A belt 37 travels around a pulley 38 on the shaft of said motor, and around a pulley 39 on a shaft 41, carrying a pinion 42 meshing with a gear wheel 43 on a shaft 44, carrying a pinion 46 meshing with gear wheels 47 on a shaft 48 carrying a sprocket wheel 49 around which travels a sprocket chain 51, which also travels around a sprocket wheel 52 on a shaft 53, carrying a bevel wheel 54, which meshes with a bevel wheel 56 on a transverse shaft 58, carrying a sprocket wheel 57 around which the sprocket chain 34 travels. Said sprocket chain is provided at suitable intervals with hooks 59, and the operator will take care to place each frame between an adjacent pair of said hooks. The frames are thus advanced on to a table 61 above a tank 62. Figure 2, containing preserving solution and heated underneath by a gas burner 63. Said table is lowered into said tank by means of a lever 64 loosely connected to a frame 66 connected to said table, said lever being operated by a cam 67 on a shaft 68, carrying a sprocket wheel 69 rotated by a sprocket chain 71 also travelling around a sprocket wheel 72 on the shaft 48. By means of said cam, said table carrying the frame is dipped for about a period of 6 or 7 seconds in said solution in the manner shown in Patent No. 1,224,711 granted to me May 1, 1917. This operation has the effect of driving out the moisture from between the skin and the shell of the egg, and also of sealing said shell, and it also has the effect of rendering very distinctly visible any cracks which are in the shell of the egg and which are otherwise likely not to be observed. An operator "C," standing near the solution, is thus able to immediately detect cracks in the upper portions of the eggs, and he removes the eggs so cracked from the frame and puts them in fillers of a case beside him. He also removes any dirty eggs, not suitable for storage. After he has removed all such eggs, he refills the frame with eggs taken from a case of eggs which have already passed through the machine. He then moves the frame on to a dripping board 74 formed of angle irons, below which extends a drip pan 76. While in this position, he places on the top of the first-named frame 24 a second frame 75 precisely like the first named frame 24 in every respect. He then inverts the two frames, as shown diagrammatically in Figure 11. The inversion can easily be made, because the eggs are too large to fall through the holes in either frame. He then removes the first-named frame which is now uppermost and in place thereof, he places on the second basket a cardboard filler 21, as shown diagrammatically in Figure 12. He then places the second basket with a filler thereon on said dripping board 74 and slides the basket along the dripping board, by pushing forwards other similar baskets on said dripping board. The foremost of such baskets thus passes through a hole in a curtain 77 forming part of one side of a candling chamber 78, in which is located an operator "D" and it is moved by said operator "D" into a position immediately over a series, here shown as 6, of incandescent electric lamps 79.

However, it is readily seen that the candler may place the filler on the basket 75 in the candling chamber, and the process will be practically the same. It is to be understood that the parts of the dripping board on each side of the candling chamber will be sufficiently long so that, should the candling be unusually delayed, or expedited, by having to remove an unusually large, or small, number of eggs from one or more fillers, the progress of the series of fillers on the dripping board will not be interrupted since the number thereon can be sufficiently large that the average time of candling eggs in the fillers will remain substantially the same.

It has been found that when a filler is placed over eggs contained in a basket as herein described, and a strong light shines beneath said eggs in a candling chamber, by reason of the cardboard filler preventing access of light to the eggs from all sides except from directly underneath, it results that any imperfection in the interior of the egg and also any crack in the upper part of the shell of the egg can immediately be detected. The operation of candling is thus greatly facilitated. By reason of this discovery, one person is able to detect the above imperfections in 36 eggs in about the same time that, in ordinary candling, a candler can detect such imperfections in 3 or 4 eggs, so that by means of this apparatus, one candler can candle 30 cases an hour, whereas, without said apparatus and under the present system, he is only able to candle about three cases an hour.

However, said candler could not detect cracks if there were any, in the bottoms of said eggs in the candling chamber, but it will be remembered that said cracks have been detected by the operator "C" and the eggs so cracked have been removed. Thus, all the cracked and spoilt eggs are removed from the basket. The candler having removed the imperfect eggs, fills the filler up with perfect eggs, which have been passed through the process. He then moves the eggs to a transfer table 81 where an operator "E" puts a cardboard flat on to the filler and also a metal flat 82 on to the cardboard flat as indicated in Figure 13, and then inverts the frame 75, filler 21, and flats 22 and 82, and with the same motion places the inverted frame 75, filler 21, and flats 22 and 82 in a case, as indicated in Figure 14. The operator "E" then removes the metal flat 82, and frame 75, as indicated in Figure 15, and places the frame 75 upon a slide 83 on which it is guided to a point in proximity to the table 6 to be used again.

By the term "filler" in the claims is meant a filler of cardboard or similar inexpensive material, in general such as is shown in Figure 6, containing individual open-ended cells in rows.

I claim:—

1. The method of preparing eggs for storage which consists in seating them in openings in a frame, immersing the frame with the eggs contained therein in a preserving solution whereby defective portions of eggs unfit for storage are rendered visible, removing from the frame any eggs unfit for storage, removing the frame and eggs from the solution, placing on the eggs a second frame, inverting the two frames to dispose the former lowermost portions of the eggs upward, removing the first frame, placing a filler on said eggs whereby the latter are individually enclosed, and subsequently candling the same.

2. The method of preparing eggs for storage which consists in seating them in openings in a frame, immersing the frame with the eggs contained therein in a preserving solution whereby defective portions of eggs unfit for storage are rendered visible, removing from the frame any eggs unfit for storage, removing the frame and eggs from the solution, placing on the eggs a second frame, inverting the two frames to dispose the former lowermost portions of the eggs upward, removing the first frame, placing a filler on said eggs whereby the latter are individually enclosed, subsequently candling the eggs to detect imperfections in their former lowermost portions, removing any eggs unfit for storage, placing a cardboard flat upon the eggs, inverting the frame, filler and flat, placing them in a case, and finally removing the frame.

VICTOR CLAIREMONT.